Dec. 1, 1964  J. CURLETT ETAL  3,158,945
AUTOMATIC LEVEL CONTROL SYSTEM FOR CONSTRUCTION MACHINES
Filed March 15, 1962  4 Sheets-Sheet 1

INVENTORS
JOHN CURLETT
RAYMOND A. GURRIES
BY
ATTORNEY

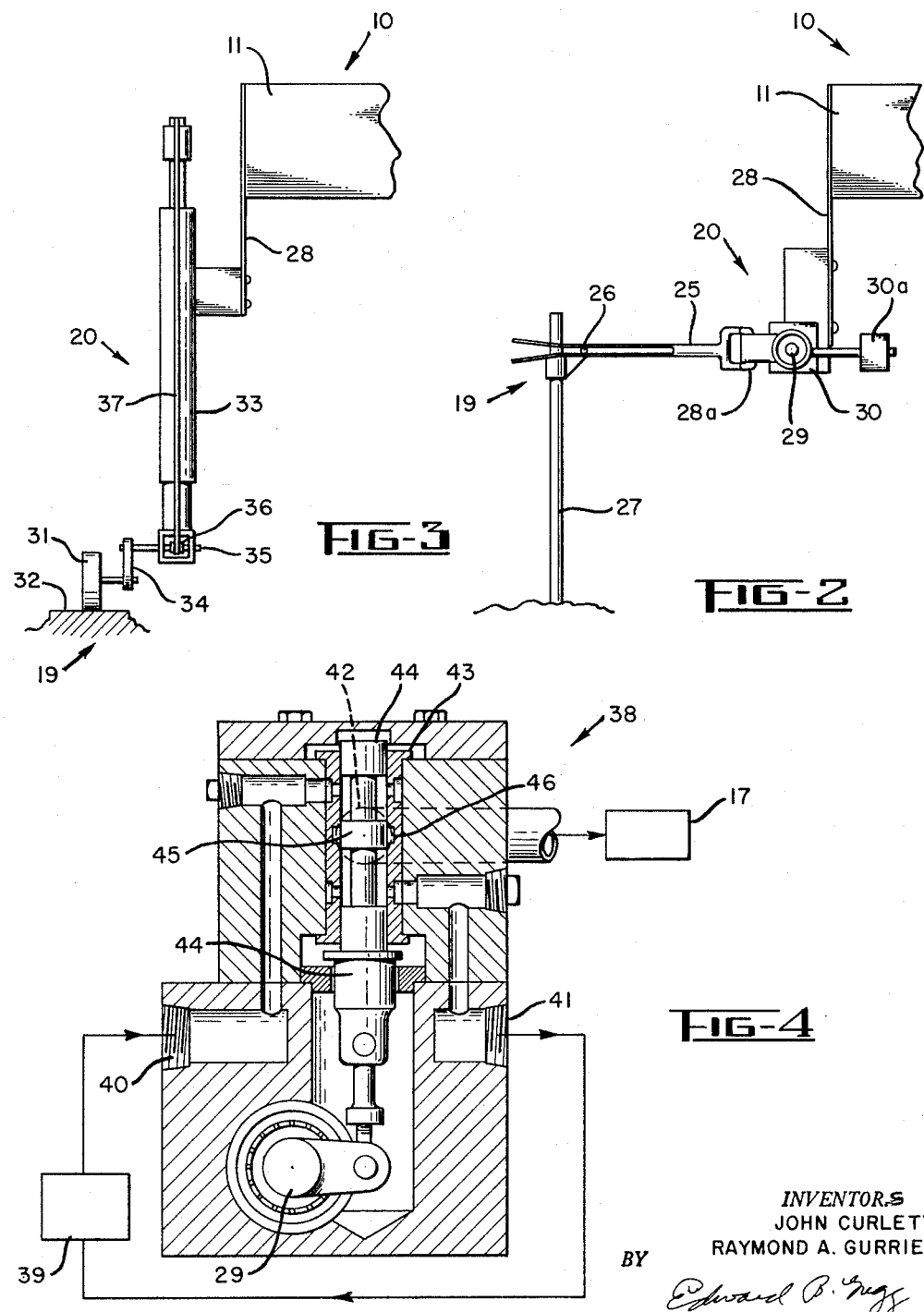

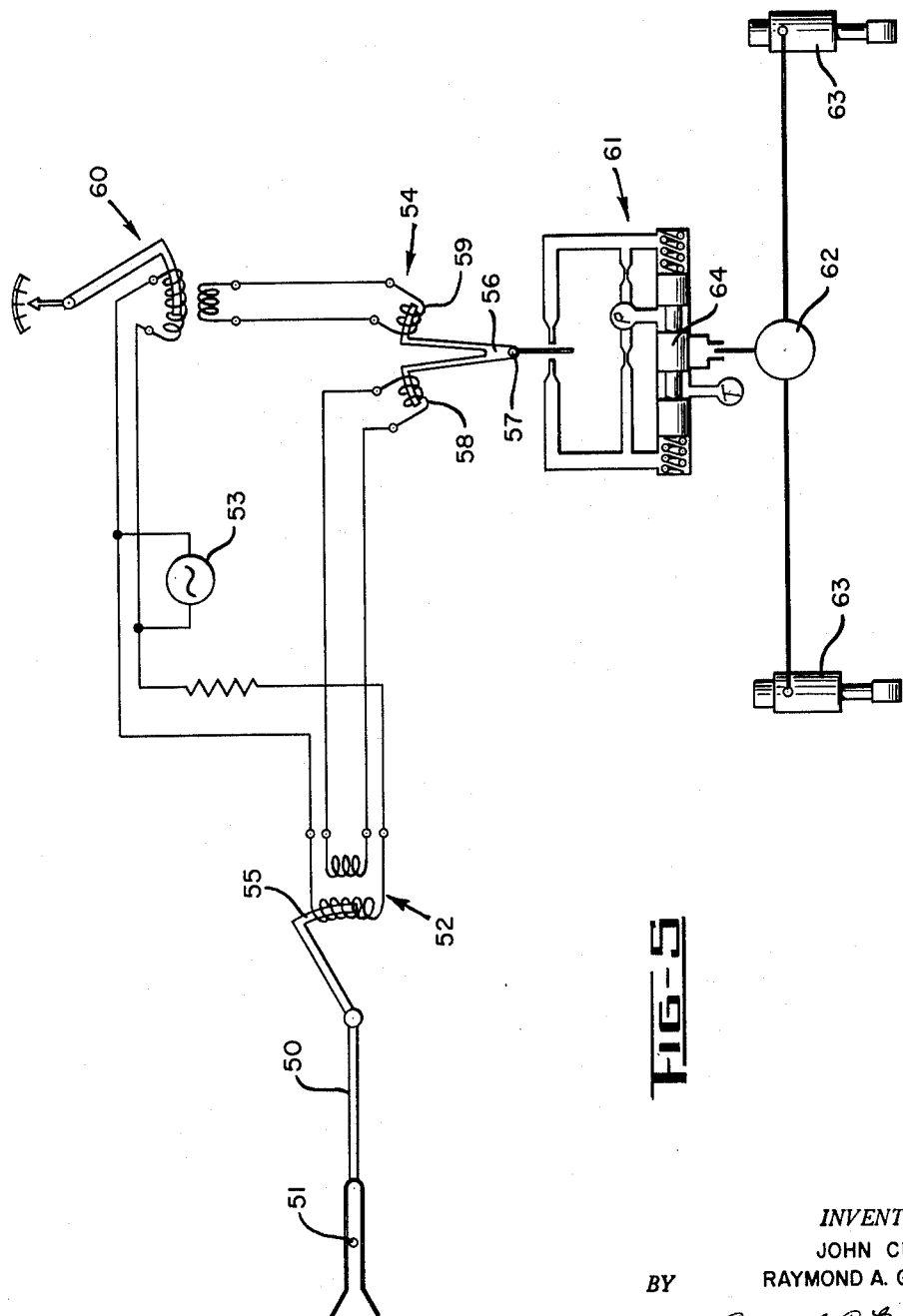

Dec. 1, 1964    J. CURLETT ET AL    3,158,945
AUTOMATIC LEVEL CONTROL SYSTEM FOR CONSTRUCTION MACHINES
Filed March 15, 1962    4 Sheets-Sheet 4

*INVENTORS*
JOHN CURLETT
RAYMOND A. GURRIES
BY
*Edward B. Gregg*
ATTORNEY 3,158,945
AUTOMATIC LEVEL CONTROL SYSTEM FOR
CONSTRUCTION MACHINES
John Curlett, Los Gatos, and Raymond A. Gurries, San
Jose, Calif., assignors to Gurries Manufacturing Co.,
San Jose, Calif., a corporation of California
Filed Mar. 15, 1962, Ser. No. 180,046
3 Claims. (Cl. 37—180)

This invention relates to level control systems for construction machines and more particularly to level control systems in which the working tool automatically follows an external reference which is located outside and along the path of travel of the machine.

This application is a continuation-in-part of our co-pending application Serial No. 862,276, filed Dec. 28, 1959 and now abandoned, for Leveling Systems for Road Building Machines.

The level control system of the present invention may be employed in road building and land leveling machinery of a wide variety of types such as scrapers; subgrading machines employed to smooth and level the various courses of soil, gravel, etc. beneath the top slab or pavement of a highway; paving machines employed to smooth and level the top pavement or slab (such as black top or Portland cement concrete) of highways; earth moving machines such as scrapers and bulldozers; machines which employ a screw type conveyor to distribute soil or aggregate and to eject surplus material; agricultural machines which are employed to level land; and the like.

All such machines have in common a main frame, a working tool, ground engaging traction means such as wheels or endless tracks, and support means for supporting the main frame upon the traction means. In machines of this character with which the present invention is concerned, a means such as hydraulic rams, jack screws or the like are provided for raising and lowering the working tool in relation to the traction means, and it is by this means that the level of the tool is controlled so that the level of grade produced by passage of the tool over the ground is controlled.

In the earliest of such machines, control was exercised by the operator who, upon noting a departure of the tool from the desired level (e.g., by noting that a follower had departed from its proper position) would actuate the level control means (e.g., a mechanical control or an hydraulic control) to correct the departure or deviation. Representative of such operator-controlled systems are Knox U.S. Patent 2,043,413 and Reising U.S. Patent 2,489,196.

An improvement upon such control methods is represented by the automatic control system of canal lining machines employed in the construction of the Friant-Kern Canal in California in the late 1940's; see, for example, an article by Joseph A. Fraps in Western Construction News, Mar. 15, 1950, pages 72 to 74. This system employed hydraulic jacks to raise and lower the frame of a machine which spanned the canal and which had traction means in the form of flanged wheels running on rails. The hydraulic jacks operated to raise and lower the frame, and with it the working tool (e.g., a strike-off blade or plate). Automatic control was provided in the form of a wire alongside the canal, a fork straddling the wire and pivoted on the machine and a pair of switches which were operated by the pivoting fork to energize one or another of two circuits to control a valve or valves to operate the hydraulic rams. The aforesaid wire served as a template or reference level (located at a predetermined height above the intended grade); the aforesaid pivoted fork served as a sensor whose departure from a null or neutral position indicated an error or deviation of the tool from its intended level; and the switches and their circuits served as a transducer to transduce this deviation (sensed by the sensor) to a power actuating means; and the latter (the hydraulic system) brought about a correction of the deviation.

Such automatic control systems provided, of course, substantial advantages over operator control. However, to our knowledge, automatic control systems of the prior art have suffered from a serious defect, namely, that they have been of the full-on, full-off type. That is to say (and as typified by the system described by Fraps), a deviation of sufficient magnitude to be sensed would close a switch, thereby energizing a circuit and causing a corrective movement but without proportionality to the amount of deviation.

Machines of the character described move slowly but they are very massive, hence involve large inertia. As a consequence they have exhibited a tendency, when controlled by "full-on, full-off" systems, to overshoot or hunt in their corrective movements and to vibrate excessively. This mode of operation results in hunting of the working tool about the position of zero error causing great wear and tear on the control system, severe and continuous demand on the adjustment means operating the support means, and a constant vibration of the main frame.

It is therefore an object of this invention to provide an automatic level control system for construction machines which is smooth in operation, making minimum demands on the adjustment means, longer lasting and more accurate than systems known heretofore.

It is another object of this invention to provide an automatic level control system for construction machines in which the velocity of adjustment produced by the adjustment means is always proportional to the error between the level of the working tool and the external reference.

It is a further object of this invention to provide an automatic level control system for construction machines in which the working tool follows an external reference disposed outside and along the path of travel of the construction machine without overshooting or hunting about the external reference level.

It is still another object of this invention to provide a practical, reliable and durable automatically operated level control system for construction machines which easily and naturally follows the external reference.

Briefly, the automatic level control system of this invention comprises a follower sensor which cooperates with an external reference such as a grade wire, a rail or a preformed surface such as a pavement and which senses the error of the working tool position with reference to the external reference level. The sensor is constructed to provide an output quantity which is proportional to the error it senses. The sensor output quantity is applied, via a transducer if necessary, to the power means which operate the adjustment. The power means is so constructed as to provide an output quantity which is proportional to its input quantity. If a transducer is employed, it likewise provides proportional operation. Consequently, the adjustment means provides an output which is substantially proportional to the error and the working tool is adjusted at the same proportional rate.

As the error become smaller, the output quantity from the power means becomes smaller so that no overshoot results. If the error is very large, the sensor provides a large output quantity which provides a proportionally large output quantity from the power means. The adjustment means, in response to a large output quantity from the power means, adjusts the working tool at a correspondingly rapid rate. As the error becomes smaller (i.e., the sensor approaches its null position), the sensor output quantity becomes smaller and so does the power means output quantity. As the error tends to zero, so does the output quantity from the power means and the rate of change of level of the working tool approaches zero.

Other objects and a better understanding of the invention may be had by reference to the following description, taken in conjunction with the accompanying drawings, in which:

FIGURE 2 is an elevational front view of a fork sensor engaging a grade wire type external reference.

FIGURE 3 is an elevational front view of a wheel sensor engaging a pavement type external reference.

FIGURE 4 is a cross sectional view of a control valve which is operable for use with a hydraulic power system and which functions as a proportional transducer for transducing the deviation of a sensor such as that shown in FIGURES 2 or 3 to a proportional power output of a hydraulic system.

FIGURE 5 is a schematic wiring diagram of a complete automatic level control system utilizing a mechanical-to-electrical-to-mechanical-to-hydraulic system.

Figure 1:
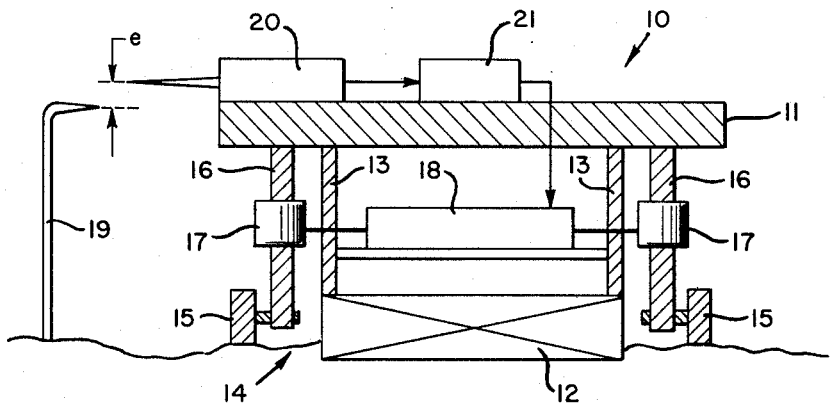
FIGURE 1 is a diagrammatic front view of a construction machine incorporating the automatic level control system of this invention which is illustrated in schematic block diagram form.

Referring now to the drawings, and particularly to FIGURE 1 thereof, there is shown a construction machine 10 having the height of its working tool automatically controlled by the control system of this invention. Construction machine 10 comprises a main frame 11 carrying a working tool 12 which may be a scraper blade, a conveyor screw, a strike-off blade or any other like instrumentality. Working tool 12 is shown connected to main frame 11 by means of tool mounting members 13.

Main frame 11 is supported for movement along the ground 14 by traction means 15 which may be, for example, endless tracks or wheels. There may be (in the case of wheels) a pair of wheels on each side in a self-supporting machine, or a single wheel on each side in a machine which is supported at one end and towed by a tractor. The main frame 11 is supported on the traction means 15 by support means 16 which include vertical adjustment means 17 such as hydraulically actuated rams or mechanically actuated jack screws for raising and lowering the height of main frame 11 with respect to ground 14.

Figure 1A:
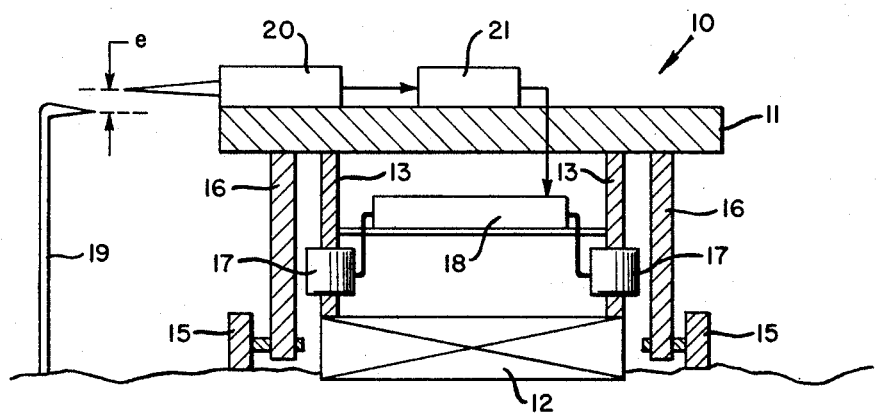
FIGURE 1A is a similar view of a similar machine in which, however, the main frame is rigidly supported on the traction means and the working tool is adjustably supported on the traction means.

In FIGURE 1 the main frame is shown as being vertically adjustable relatively to the traction means, but the frame may be fixed in relation to the traction means, while the tool 12 is adjustably supported, as shown in FIGURE 1A, the important point being that the tool 12 is vertically adjustable in relation to the traction means 15, whether by means of adjustment of the frame itself, or by independent adjustment of the tool.

A power means 18 is provided for operatively actuating adjustment means 17. When adjustment means 17 are in the form of hydraulic rams, power means 18 comprises a hydraulic pressure supply and return system connected to the rams through a valve having a valve operating element. When adjustment means 17 is in the form of jack screws, power means 18 may comprise a variable speed high torque motor whose output shaft is connected to the jackscrews through a suitable gear means.

Along and outside the path taken by the construction machine 10 is an external reference diagrammatically shown at 19, which may comprise a taut grade wire which is supported by stakes, an existing pavement, a preformed surface such as a strip of roadway that has been previously graded, a rail or the like. In certain instances external reference 19 may be in the form of a collimated beam of electromagnetic radiation, the direction of the beam being the selected external grade reference in much the same manner as a grade wire.

Even though only a single external reference level is shown, it is within the contemplation of this invention to provide an external reference level on either side or both sides of the path of construction machine 10. A single external reference will be adequate to control the height of the working tool as the machine advances, and thereby the grade, as long as adjustment means 17 on both sides of the construction machine 10 are controlled. In case cross slope control of the working tool is desired (i.e., the slope from one side to the other of the path of movement), in addition to grade control, it is advantageous to provide a reference on each side, each controlling the height of one side of the tool 12 so that one side can be maintained higher than the other and grading can be accomplished with a predetermined cross slope.

The automatic control system for controlling the grade (and slope) of construction machine 10 further includes a sensor means 20 mounted to move with working tool 12 and to cooperatively engage external reference 19. Sensor means 20 is constructed to provide an output quantity which is proportional to the error, i.e., the distance between the actual level and the desired level of working tool 12 as determined by external reference 19. Sensor 20 may take a variety of forms, such as an outwardly extending, pivoted, forked arm engaging and having a running fit with a grade wire, or an outrigger wheel running along a preformed surface such as a pavement, or a detector sensing a beam of electromagnetic radiation. In case sensor 20 is formed as an arm, it senses the error "$e$" in terms of angular displacement from a zero position, the displacement being proportional to the error. In case sensor 20 is in the form of a radiation detector, it senses the error "$e$" in terms of radiation receiving area.

The output quantity from sensor means 20, which is proportional to error "$e$," is applied to power means 18 either directly or through a transducer means 21 depending on whether the output quantity of sensor means 20 is in such a form as to be readily acceptable to actuate power means 18. For example, if power means 18 is in the form of an hydraulic system which can be actuated by an easily operated valve, the sensor may be in the form of the operator (e.g. a lever) for the main control valve which in turn operates the hydraulic power means 18. Alternatively, the sensor may directly operate a pilot valve which in turn operates the main valve, both such valves having a proportional characteristic, i.e., a power output quantity which is proportional to the movement of the valve. If power means 18 comprises a variable speed torque motor, the mechanical motion of a wire fork will first be converted into an electrical signal, transducer means 21 being the means for performing such a conversion.

Before describing a number of examples of the above described automatic control system it is helpful to review the conditions which are responsible for the smooth operation of the control system of this invention. Sensor means 20 is constructed to provide an output quantity which is substantially proportional to error $e$. This proportionality is carried through the complete control system so that the quantity applied to adjustment means 17 reflects the amount of error $e$ sensed. Consequently, if a transducer means 21 is utilized, it is a substantially linear (or some other, nonlinear but proportional) device; that is, its output quantity is proportional to its input quantity. Further, power means 18 is likewise a device in which the input and output quantities are related so that there is proportionality. The type of proportionality selected depends on the tightness of the servo loop desired. In this regard reference may be had to servo mechanism theory.

FIGURE 2 shows an embodiment of a sensor means 20 in the form of a fork 25 which straddles an external reference 19 in the form of a taut grade wire 26 supported upon stakes 27. Fork 25 is supported on main frame 11 by means of a bracket 28. It is spring biased and pivoted to swing about a vertical axis at 28a to permit it to swing past stakes 27 as the machine 10 moves along the ground, and it is fixed to the operating shaft 29 of a mechanical linkage 30 of a valve such as that shown at 38 in FIGURE 4. A counterweight 30a is shown. The sensor 20 is carried by the frame 11 as is the working tool 12. Therefore any error between the position of the working tool and the grade wire 26 is sensed by fork 25, whose angular inclination (the sensor output quantity), is a direct measure of the error $e$. The angular inclination is measured by the rotational position of shaft 29. Shaft 29 is coupled to the actuating element of the main valve of a hydraulic power means, or to a pilot valve which controls the main valve. It will be understood that if, as in FIGURE 1A, the main frame is fixed in relation to the traction means but the working tool is vertically adjustable, the sensor 20 of FIGURE 1 will be carried by the tool or its support means so as to move with the tool.

FIGURE 3 shows another embodiment of a sensor means 20 formed in the shape of a follower wheel 31 which rides upon an external reference 19 in the form of a preformed surface such as a pavement 32. Follower wheel 31 is carried by main frame 11 through a bracket 28, a housing 33 and a rocker means 34 which is pivotably mounted to the lower housing portion. As the working tool changes in height in relation to surface 32, a rocker 34 pivots about pivot shaft 35 which is connected by a rocker 36 to a connecting rod 37. The motion of rod 37 is the sensor output quantity which is always proportional to the error $e$. Rod 37 may be utilized to actuate the main control valve of a hydraulic power means or a pilot valve which in turn operates the main valve.

FIGURE 4 shows a preferred form of transducer in the form of a valve 38 which receives pressure from an hydraulic pressure and return system 39. The valve 38 is of well known type, being a plunger or spool type valve having a pressure inlet 40, a return output 41 and an intermediate port 42 which connects to a hydraulic ram (or rams) 17. The valve 38 is formed with a bore which receives a sleeve 43 to which the pressure inlet port 40 and the return port 41 connect. As will be seen the valve 38 is also provided with a plunger or spool 44 which has a land 45. In its neutral or closed position the spool 44 locates the land 45 in registry with an annular channel 46 formed in the sleeve 43. The channel 46 is in registry with the intermediate port 42 and provides the only means of communication between the port 42 and the interior of sleeve 43. The land is very slightly wider (i.e., its dimension in an axial direction along spool 44 is very slightly greater) than the width of channel 46. Therefore, when plunger 44 is in its neutral position no pressure can pass between ports 40 and 42, or between ports 42 and 41. No fluid can pass through the valve; it is closed. But upon a very slight upward movement (as viewed in FIGURE 4) of plunger 44, land 45 will uncover the lowermost portion of channel 46 and ports 42 and 41 are communicated but flow is greatly throttled. If plunger 44 moves to a greater degree, it will uncover more of channel 46 and flow will increase. Similarly, upon slight downward movement of plunger 44, land 45 will uncover the uppermost portion of channel 46 and ports 40 and 42 will be communicated but flow will be greatly throttled; and upon greater movement of spool 44 the degree of uncovering of channel 46 and of flow of fluid will increase.

It will be seen that valve 38 is, in fact, a proportional transducer. The motion of spool 44 (caused by motion of sensor 20; see FIGURE 2, through shaft 29 and the mechanical linkage shown), is proportional to the error $e$ and it controls the rate of flow of fluid from port 40 to port 42 thence to hydraulic cylinders 17 (or it controls the rate of flow of fluid from cylinders 17 through port 42 to return port 41) in proportion to the error $e$. As noted the relationship of sensor movement to the rate of flow need not be linear, so long as it is proportional.

The valve 38, as stated is a well known type of plunger, slide or spool valve whose flow characteristics (proportionality to the displacement of its land from closed position, throttled flow upon a slight displacement, etc.) are well known. Such valves are preferred because they can be purchased as standard items, therefore require no special fabrication and can be easily replaced or repaired when damaged or worn. They can be used as the main control valve as illustrated or they can be used as pilot valves to direct pressure to and from a main control valve.

Figure 10:
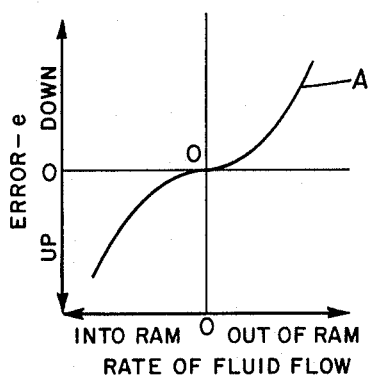
FIGURE 10 is a graph showing the relation between error and several other quantities.

A typical example of the relationship between axial displacement of plunger 44 and the volume of fluid flow per unit time is shown by curve A, FIGURE 10 in which the abscissae represent the volume of fluid flow per unit time and the ordinates represent the axial displacement. It is not necessary that the curve be linear as long as the fluid flow diminishes as the error $e$ tends to zero. Also, the proportionality is not as critical for large errors as for small errors. Proportionality is most important about the position of zero error $e$, say for angular inclinations of the sensor between ±10 degrees.

FIGURE 5 shows a complete automatic control system in which a mechanical sensor means such as fork 50 follows a taut grade wire 51. A first transducer means such as transformer 52 has its primary winding coupled to an alternating current source 53 and its secondary winding coupled to a torque motor 54. The primary winding surrounds a movable core member 55 carried by fork 50, the motion of core member 50 being the output quantity of the sensor means.

Motion of core 55 changes the flux linkage so that the alternating current induced in the secondary winding of transformer 52 is proportional to the position of core 55. Accordingly, a first transducer means for proportionally changing the angular mechanical motion of fork 50 into an alternating electric current is provided.

Torque motor 54 provides a second transducer means for converting the alternating current in the secondary winding of transformer 52 into a mechanical motion of a flapper valve element 56 pivotably supported about pivot point 57. Torque motor 54 is provided with a pair of windings 58 and 59 which upon zero error are adjusted to move element 56 to its neutral position. Winding 58 is connected directly to the secondary winding or transformer 52 and winding 59 is directly connected to a balancing means 60 in a manner well known to those skilled in the art.

The output quantity of second transducer 54 is again proportional to the error $e$ and is utilized to actuate a conventional hydraulic amplifier and valve combination 61 which constitutes the power means in this embodiment. The flapper valve controlled amplifier and valve combination 61 is again proportional in that the volume of fluid flow per unit time to a flow divider or distributor 62 and hydraulic rams 63 is proportional to the angular position of flapper valve element 56, a relationship which may again be represented by curve A of FIGURE 10 and explained heretofore. Flow divider 62 and rams 63 constitute the adjustment means.

As will be seen, the hydraulic amplifier and valve combination 61 comprises a source of pressure P, a tank or sump T and a plunger type or spool valve balanced by springs. The land 64, when the valve is in its neutral, closed position, covers the duct leading to flow divider 62. If the flapper 56 is pivoted to the left as viewed in FIGURE 5, the escape of pressure through the left-hand restricted orifice is diminished and the escape of pressure through the right hand restricted orifice is augmented, thereby reducing hydraulic pressure on the right and increasing it on the left of the spool. The spool will, therefore, move to the right communicating rams 63 with tank T and removing fluid from the rams. Contrariwise, if the flapper is pivoted to the right, pressure source P communicates with the rams 63. The rate of outflow or inflow of fluid out of or into the rams 63 will be proportional to the degree of movement of the spool, therefore to the error *e*. The flow divider 62 functions (as explained in our copending application Serial No. 862,276) to cause rams 63 to move at the same rate and to the same degree by dividing the flow of fluid evenly into and out of the rams.

Figure 6:
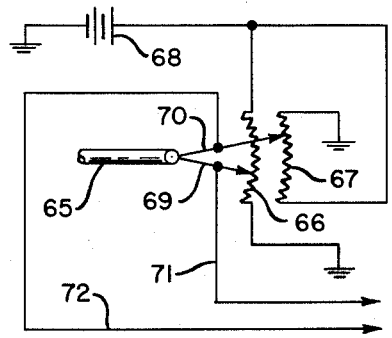
FIGURE 6 is a schematic wiring diagram of a mechanical-to-electrical sensor.

FIGURE 6 shows a further embodiment of a transducer means, actuated by a fork sensor 65, for converting an angular mechanical displacement into a direct current proportional to the displacement. In fact, in the embodiment shown, the polarity of the current is indicative of the direction of error *e* and the magnitude of the current is indicative of the size of the error.

Figure 7:
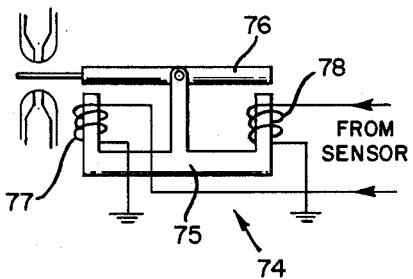
FIGURE 7 is a schematic diagram of an electrical-to-mechanical transducer for hydraulic operation.

A pair of oppositely poled wire-wound potentiometers 66, 67 are connected to a source of direct current 68. Each potentiometer is provided with a slide arm 69, 70 rigid with fork 65. A pair of output leads 71, 72 are respectively attached to slide arms 69, 70. Accordingly, an output quantity in the form of a potential difference and a polarity is provided between leads 71 and 72 which may be applied either directly to a power means such as an amplidyne controlled variable and reversible speed direct current torque motor (see FIGURE 9), an alternating current torque motor or the like to provide proportional control of the adjustment means. FIGURE 7 shows an alternate form of transducer which may be utilized with a transducer such as shown in FIGURE 6 to convert a direct current potential between two leads into mechanical motion of a flapper valve element. Basically transducer 74 comprises an E-shaped electromagnetic core 75 in which the center leg carries the pivot shaft for pivotably supporting flapper valve element 76. Each outer leg is surrounded by a winding 77 or 78 which are differentially energized such as for example leads 71, 72 of FIGURE 6. The advantage of torque motor 74 over that of torque motor 54 (FIGURE 5) is that no balancing system is needed.

Figure 8:
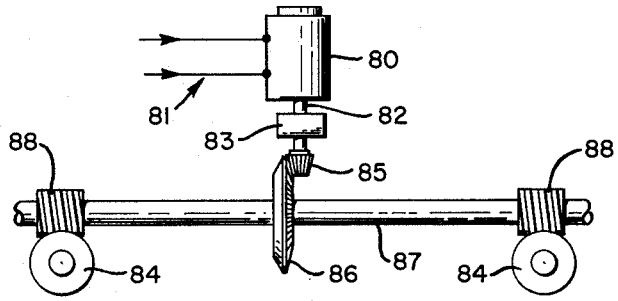
FIGURE 8 is a schematic diagram of an electrical-to-mechanical transducer for mechanical operation.

FIGURE 8 shows a power means in the form of a variable speed, reversible high torque motor 80 (servo motor) energized by an input quantity such as a direct current applied to input terminals 81. Motor shaft 82 is coupled to the adjustment means through a suitable gear reduction box 83. The adjustment means is in the form of a pair of screw jacks 84 which raise and lower the working tool upon being rotated in one or the other directions. The output shaft from gear box 83 is provided with a pinion gear 85 which engages a mating disc gear 86 mounted integrally with a shaft 87. Shaft 87 is provided with worm gears 88 which engage screw jacks 84.

As previously indicated, motor 80 must have the required output power, be easily reversible and be capable of providing an output speed which is proportional to the input quantity. In other words, the relation between input and output quantity should follow curve A, FIGURE 10. In this instance the abscissae represent the angular velocity of shaft 82 (or 87) and the ordinates represent the magnitude and polarity of the potential applied to the motor.

Figure 9:
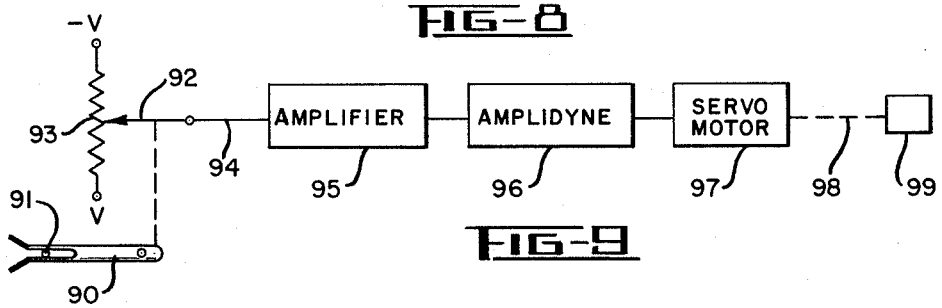
FIGURE 9 is a schematic block diagram of another embodiment of a complete automatic level control system utilizing a mechanical-to-electrical-to-mechanical system.

FIGURE 9 shows a direct current control system in which a fork 90, straddling a grade wire 91, is mechanically connected to a slide contact 92 of a wire-wound potentiometer 93. The signal appearing on potentiometer output lead 94 in conventional servomechanism nomenclature is the error signal. The error signal is an indication of the difference between actual height and selected height of the working tool. The system as a whole is a closed loop system. The error system is applied to a conventional servo amplifier 95.

Amplifier 95 is connected to an amplidyne generator 96 which actuates a direct current servo motor 97 having an output shaft 98 for actuating adjustment means 99. Motor 97 has a constant magnetic field which is provided by generator 96 as well known to those skilled in the art.

It is of course to be understood that alternating servo motors may likewise be utilized in practicing the instant invention. For example, a single-phase induction motor having either a "wound" rotor or a "cage" rotor to produce a revolving magnetic field is eminently useful.

There has been described a level control system for use with construction machines which forms a closed loop servo-mechanism with an external reference disposed outside and along the path of the construction machine. The operation of system is smooth and provides for minimum demands upon the various power members controlling the working tool height by avoiding overshoot and hunting.

What is claimed is:

1. An automatic level control system for construction machines of the type having a working tool carried upon traction means by vertically adjustable support means, said control system comprising; a power means for actuating said support means, said power means being responsive to a power means being responsive to a power means input quantity and being operative to provide a support means input quantity proportional in sense and magnitude to said power means input quantity; a sensor means movable with said working tool and cooperatively engageable with an external reference disposed along and outside the path of travel of said construction machine, said sensor means being responsive to the difference between the actual height of said working tool and a selected height in accordance with said external reference level and operative to provide a sensor means output quantity proportional in sense and magnitude to said difference in height; and a transducer means responsive to said sensor means output quantity and operative to provide said power means with an input quantity which is proportional to said sensor means output quantity, said support means comprising a hydraulic ram means and said power means comprising a hydraulic pressure and return system including a valve means having a valve actuating member, said valve means being connected to said hydraulic system and to said hydraulic ram means to supply fluid to and remove fluid from said ram means, said sensor means providing an angular displacement and said transducer means first converting said angular displacement into an electrical signal and secondly converting said electrical signal into mechanical motion of an output member, said output member being operatively connected to said valve actuating member.

2. An automatic level control system for construction machines of the type having a working tool carried upon traction means by vertically adjustable support means, said control system comprising; a power means for actuating said support means, said power means being responsive to a power means input quantity and being operative to provide a support means input quantity proportional in sense and magnitude to said power means input quantity; a sensor means movable with said working tool and cooperatively engageable with an external reference disposed along and outside the path of travel of said construction machine, said sensor means being responsive to the difference between the actual height of said working tool and a selected height in accordance with said external reference level and operative to provide a sensor means output quantity proportional in sense and magnitude to said difference in height; and a transducer means responsive to said sensor means output quantity and operative to provide said power means with an input quantity which is proportional to said sensor means and output quantity, said support means comprising a jackscrew means and said power means comprising a servo motor system operatively connected to said jackscrew means, and in which said sensor means provides an angular displacement and said transducer means converts said angular displacement into an electrical signal, said electrical signal forming said power means input quantity.

3. An automatic level control system for construction machines of the type having a working tool carried upon traction means by vertically adjustable support means, said control system comprising; a power means for actuating said support means, said power means being responsive to a power means input quantity and being operative to provide a support means input quantity proportional in sense and magnitude to said power means input quantity; a sensor means movable with said working tool and cooperatively engageable with an external reference disposed along and outside the path of travel of said construction machine, said sensor means being responsive to the difference between the actual height of said working tool and a selected height in accordance with said external reference level and operative to provide a sensor means output quantity proportional in sense and magnitude to said difference in height; and a transducer means responsive to said sensor means output quantity and operative to provide said power means with an input quantity which is proportional to said sensor means output quantity, said vertically adjustable support means being mechanically movable, said sensor means including a member mechanically displaceable in response to a variation in height of said working tool relative to said external reference, and said transducer means being operative to convert the displacement of said displaceable member to a proportional electrical signal determinative of said power means input quantity for controlling the movement of said adjustable support means.

References Cited in the file of this patent

UNITED STATES PATENTS

| | | |
|---|---|---|
| 2,295,519 | Milliken et al. | Sept. 8, 1942 |
| 2,846,635 | Shea | Aug. 5, 1958 |
| 2,864,452 | Guntert et al. | Dec. 16, 1958 |
| 2,922,345 | Mentes | Jan. 26, 1960 |

UNITED STATES PATENT OFFICE
CERTIFICATE OF CORRECTION

Patent No. 3,158,945  December 1, 1964

John Curlett et al.

It is hereby certified that error appears in the above numbered patent requiring correction and that the said Letters Patent should read as corrected below.

Column 8, line 36, strike out "being responsive to a power means".

Signed and sealed this 21st day of December 1965.

(SEAL)
Attest:

ERNEST W. SWIDER
Attesting Officer

EDWARD J. BRENNER
Commissioner of Patents